US009509386B2

(12) United States Patent
Watanabe

(10) Patent No.: US 9,509,386 B2
(45) Date of Patent: Nov. 29, 2016

(54) RADIO AND ANTENNA SELECTION METHOD FOR RADIO

(75) Inventor: Kotaro Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/416,180

(22) PCT Filed: Aug. 21, 2012

(86) PCT No.: PCT/JP2012/005239
§ 371 (c)(1),
(2), (4) Date: Jan. 21, 2015

(87) PCT Pub. No.: WO2014/030183
PCT Pub. Date: Feb. 27, 2014

(65) Prior Publication Data
US 2015/0207553 A1   Jul. 23, 2015

(51) Int. Cl.
*H04L 1/00*          (2006.01)
*H04B 7/06*          (2006.01)
(Continued)

(52) U.S. Cl.
CPC ........... *H04B 7/0608* (2013.01); *H04B 7/0811* (2013.01); *H04B 17/336* (2015.01); *H04L 1/06* (2013.01); *H04L 1/20* (2013.01); *H04L 27/14* (2013.01); *H04W 24/08* (2013.01)

(58) Field of Classification Search
CPC ... H04W 24/00; H04W 24/01; H04W 24/02; H04W 24/03; H04W 24/04; H04L 1/20; H04L 1/0009; H04L 27/2647; H04B 17/006; H04B 17/005
USPC .......... 370/252, 230, 310, 329, 341
See application file for complete search history.

(56) References Cited

U.S. PATENT DOCUMENTS 6,028,894 A * 2/2000 Oishi .................. H04B 1/1027
                                             375/227
7,593,378 B1 * 9/2009 Murali ............. H04W 52/0245
                                             370/210

(Continued)

FOREIGN PATENT DOCUMENTS

JP       8 307287       11/1996
JP       9 64924         3/1997
(Continued)

OTHER PUBLICATIONS

Korean Office Action issued Dec. 16, 2015 in Patent Application No. 10-2015-7005158 (with English translation).

(Continued)

*Primary Examiner* — Dady Chery
(74) *Attorney, Agent, or Firm* — Oblon, McClelland, Maier & Neustadt, L.L.P.

(57) ABSTRACT

A radio that calculates an SINR on a basis of received preamble information received by an antenna and corresponding preamble information stored in advance corresponding to the received preamble information, the radio including: an integration unit that calculates a phase signal for each symbol with respect to the received preamble information; a power value calculation unit that calculates a power value on a basis of the phase signal; a correlation calculation unit that calculates a desired signal power from a correlation value between the phase signal and the corresponding preamble information; and an SINR calculation unit that calculates an SINR value from the power value and the desired signal power.

7 Claims, 13 Drawing Sheets

(51) Int. Cl.
*H04B 7/08* (2006.01)
*H04L 1/06* (2006.01)
*H04L 1/20* (2006.01)
*H04B 17/336* (2015.01)
*H04L 27/14* (2006.01)
*H04W 24/08* (2009.01)

(56) References Cited

U.S. PATENT DOCUMENTS

| | | | |
|---|---|---|---|
| 8,045,449 B2 | 10/2011 | Sadri et al. | |
| 8,254,477 B2* | 8/2012 | Sahara | H04L 27/2605 375/220 |
| 8,351,345 B2* | 1/2013 | Fujita | H04W 72/085 370/252 |
| 8,379,776 B2* | 2/2013 | Sahara | H04L 27/2605 370/479 |
| 8,730,894 B2 | 5/2014 | Sadri et al. | |
| 2004/0146124 A1 | 7/2004 | Shiung | |
| 2004/0190663 A1* | 9/2004 | Carsello | H04L 7/042 375/354 |
| 2005/0141412 A1 | 6/2005 | Sadri et al. | |
| 2007/0217495 A1* | 9/2007 | Han | H04B 17/336 375/227 |
| 2009/0141786 A1* | 6/2009 | Park | H04L 27/2647 375/227 |

FOREIGN PATENT DOCUMENTS

| | | |
|---|---|---|
| JP | 2002 344383 | 11/2002 |
| JP | 2004 229249 | 8/2004 |
| JP | 2004 304584 | 10/2004 |
| JP | 2005 159504 | 6/2005 |
| JP | 2005 184407 | 7/2005 |
| JP | 2006 523425 | 10/2006 |
| JP | 2007 516673 | 6/2007 |
| JP | 2012 39474 | 2/2012 |
| KR | 10-2007-0090520 A | 9/2007 |
| KR | 10-2008-0068242 A | 7/2008 |
| WO | WO 2008/088194 A1 | 7/2008 |

OTHER PUBLICATIONS

International Search Report Issued Oct. 9, 2012 in PCT/JP12/005239 Filed Aug. 21, 2012.

* cited by examiner

| PREAMBLE | UNIQUE WORD | PHY PAYLOAD |

101, 102, 103

RADIO AND ANTENNA SELECTION METHOD FOR RADIO

FIELD

The present invention relates to a transmit and receive antenna selection diversity technique for a radio based on an SINR value in GMSK and GFSK modulation.

BACKGROUND

In frequency modulation, which is one of the communication methods and in which communication is performed by causing an instantaneous frequency to be proportional to the modulation baseband, GFSK (Gaussian-filtered Frequency Shift Keying), in which a band is limited by applying a Gaussian filter to a modulated signal, and GMSK (Gaussian-filtered Minimum Shift Keying), in which minimum instantaneous frequencies whose shifts are orthogonal, are known as communication methods. These are also generally referred to as FSK modulation.

In radio communication, fading occurs due to multipath at the time of reception and this significantly reduces received power. If the received power is reduced due to fading, a problem arises in that the performance of demodulation of the received signal deteriorates. One technique to solve this problem is a diversity technique, in which a plurality of antennas are used so as to utilize the fact that the propagation paths of signals received by the antennas are different from each other. Various diversity techniques are present and one of them is an antenna selection diversity technique, in which one antenna is selected from among a plurality of antennas. With this antenna selection diversity technique, when a signal is transmitted or received, an antenna having excellent propagation path characteristics is selected to transmit or receive the signal, thereby improving the communication quality.

A diversity technique is disclosed in Patent Literature 1 in which the FSK demodulator selects an antenna having a larger RSSI value (received signal strength) of a received signal on the basis of the detection result of a preamble signal.

CITATION LIST

Patent Literature

Patent Literature 1: Japanese Patent Application Laid-open No. H09-064924

SUMMARY

Technical Problem

In the antenna selection diversity technique disclosed in Patent Literature 1, an antenna is selected on the basis of an RSSI value; however, when an interference wave is present, the communication quality is not always improved when an antenna having a large RSSI value is selected because the interference wave is mixed even if the received power is large.

The present invention has been achieved in view of the above and an object of the present invention is to improve the accuracy of the selection of an antenna and to improve the communication quality by using an antenna selection diversity that uses an SINR (Signal to Interference and Noise Ratio) obtained by using a preamble of a data frame as a reference.

Solution to Problem

In order to solve the above problems and achieve the object, a radio is a radio that calculates an SINR on a basis of received preamble information received by an antenna and corresponding preamble information stored in advance corresponding to the received preamble information, the radio including: an integration unit that calculates a phase signal for each symbol with respect to the received preamble information; a power value calculation unit that calculates a power value on a basis of the phase signal; a correlation calculation unit that calculates a desired signal power from a correlation value between the phase signal and the corresponding preamble information; and an SINR calculation unit that calculates an SINR value from the power value and the desired signal power.

A radio further including an antenna selection unit, wherein the antenna selection unit selects an antenna on a basis of a first SINR value calculated from received preamble information received by a first antenna and a second SINR value calculated from received preamble information received by a second antenna.

A radio further including an antenna switching unit, wherein the antenna switching unit causes an antenna selected by the antenna selection unit to transmit a radio signal.

A radio further including an antenna switching unit, wherein the antenna switching unit causes an antenna selected by the antenna selection unit to receive a radio signal.

A radio further including a phase detection unit; and a bit-timing-offset detection unit, wherein the phase detection unit calculates a phase on a basis of a desired signal power calculated by the correlation calculation unit, and the bit-timing-offset detection unit detects a bit timing offset on a basis of a phase detected by the phase detection unit.

A radio further including a received power detection unit, wherein when an SINR value corresponding to the selected antenna is smaller than a predetermined threshold, the received power detection unit calculates a first received power when the first antenna receives a received preamble and calculates a second received power when the second antenna receives a received preamble, and the antenna selection unit selects an antenna on a basis of the first received power and the second received power.

Advantageous Effects of Invention

According to a radio and an antenna selection method for a radio in the present invention, a desired wave can be separated from an interference wave and noise by using a preamble by the power value calculation unit that calculates a power value on the basis of a phase signal and the correlation calculation unit that calculates a desired signal power from the correlation value between the phase signal and corresponding preamble information; therefore, it is possible to reduce interference by the receive antenna selection diversity on the basis of the SINR estimated value.

DESCRIPTION OF EMBODIMENTS

Exemplary embodiments of a radio and an antenna selection method for a radio according to the present invention will be explained below in detail with reference to the drawings. This invention is not limited to the embodiments.

First Embodiment

Figure 1:
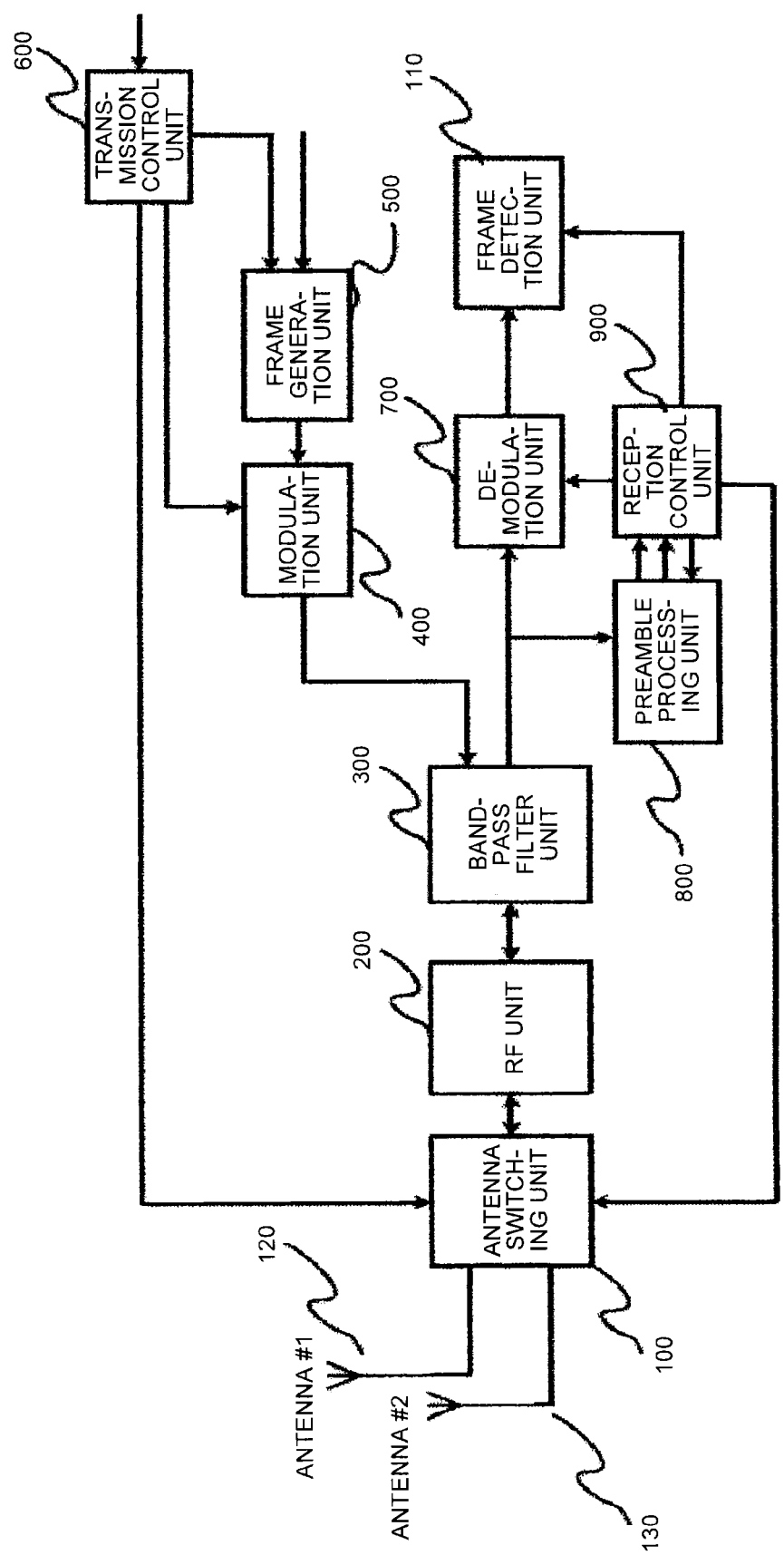
FIG. 1 is an overall view of a radio transceiver according to a first embodiment.

FIG. 1 is a diagram illustrating a radio transceiver according to a first embodiment of this invention. FIG. 1 illustrates an antenna switching unit 100, an RF unit 200, a bandpass filter unit 300, a modulation unit 400, a frame generation unit 500, a transmission control unit 600, a demodulation unit 700, a preamble processing unit 800, a reception control unit 900, a frame detection unit 110, an antenna #1 120, which is a first antenna, and an antenna #2 130, which is a second antenna. An explanation will be given here of a case where one radio transceiver includes functions for transmitting and receiving radio signals. Moreover, an explanation will be given here of a case where the radio transceiver includes two antennas; however, it is not limited thereto and the number of antennas is three or more in some cases.

Figure 2:
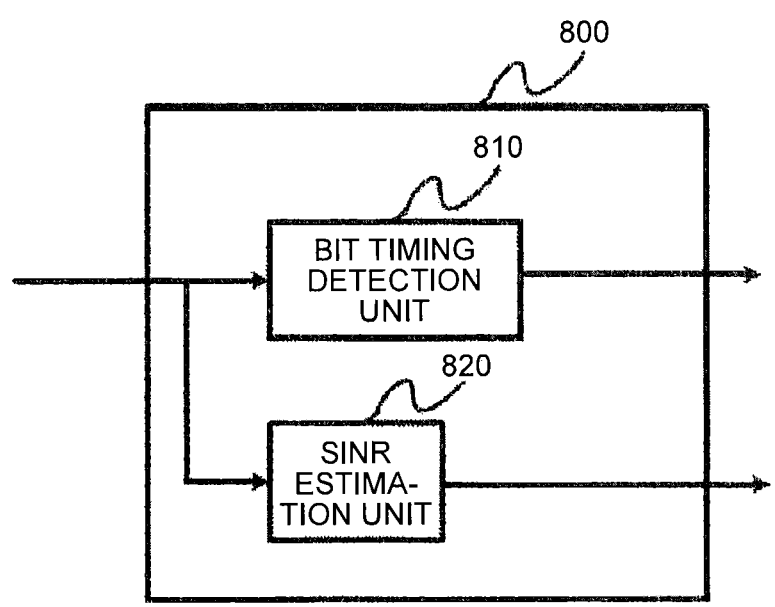
FIG. 2 is a diagram illustrating a preamble processing unit according to the first embodiment.

FIG. 2 is a diagram illustrating details of the preamble processing unit 800 according to the present embodiment. FIG. 2 illustrates a bit timing detection unit 810 and an SINR estimation unit 820.

Figure 3:
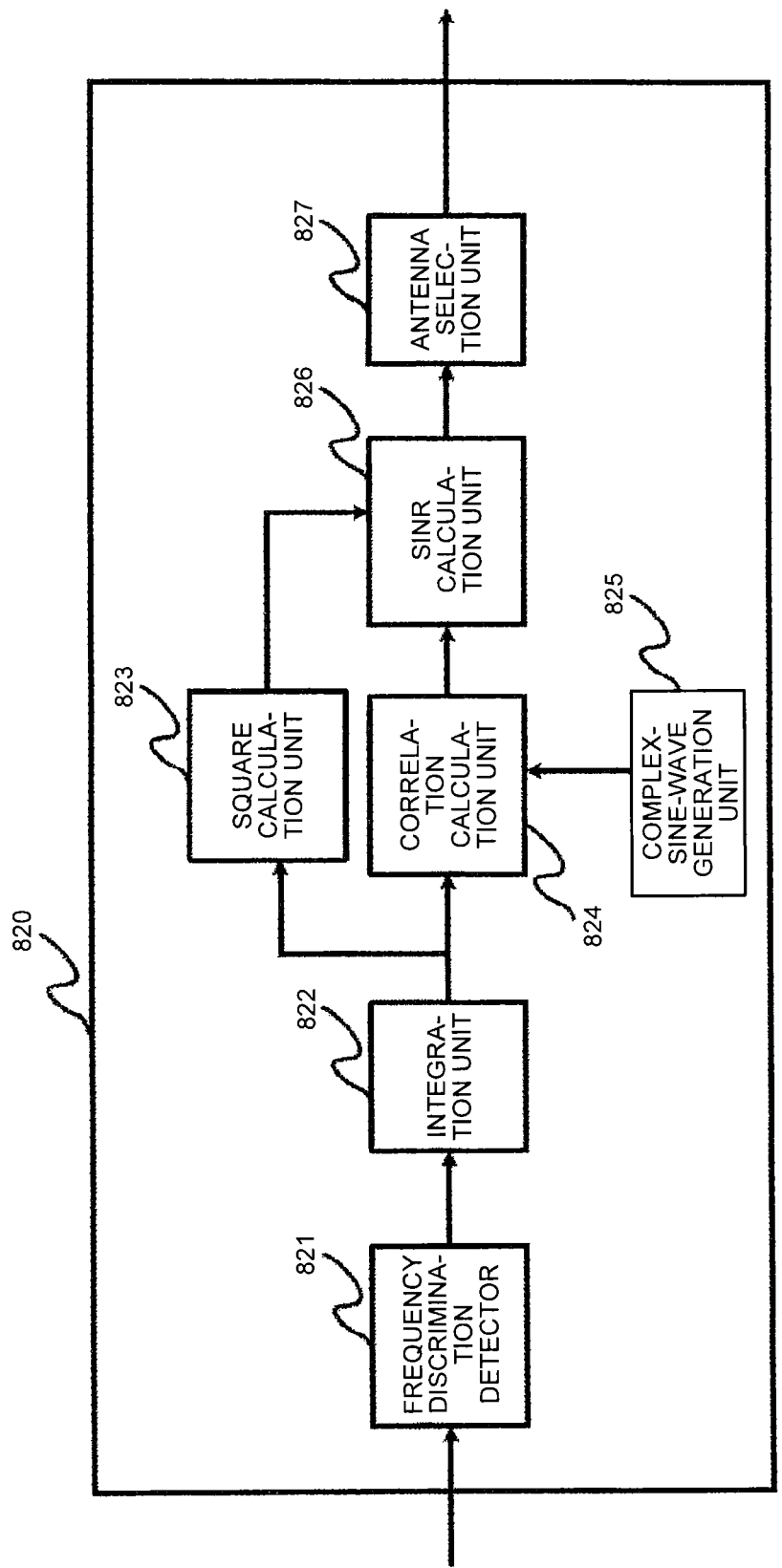
FIG. 3 is a diagram illustrating an SINR estimation unit according to the first embodiment.

FIG. 3 is a diagram illustrating details of the SINR estimation unit 820 according to the present embodiment. FIG. 3 illustrates a frequency discrimination detector 821, an integration unit 822, a square calculation unit 823, which is a power value calculation unit, a correlation calculation unit 824, a complex-sine-wave generation unit 825, an SINR calculation unit 826, and an antenna selection unit 827.

Figure 4:
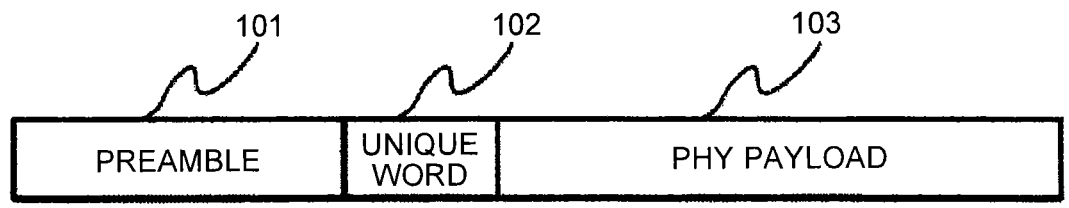
FIG. 4 is a diagram illustrating a frame configuration according to the first embodiment.

FIG. 4 illustrates a frame configuration of data received by the radio transceiver. The frame configuration includes a preamble 101, a unique word 102, and a PHY payload 103. The preamble 101 consists of bits representing either "0" or "1" with "0"s continuing and thereafter the same number of "1"s continuing. When "0"s or "1"s are not continuous, "0" and "1" alternate. The preamble has various patterns, such as "0101010101 . . . ", in which "0" and "1" alternate, "001100110011 . . . ", in which two continuous "0"s and two continuous "1"s alternate, and "000111000111 . . . ", in which three continuous "0"s and three continuous "1"s alternate. The order of "0"s and "1"s may be reversed. The information on the preamble is shared in advance by the transmitter that transmits data and the receiver that receives the data. The frame configuration is not necessarily limited to that illustrated in FIG. 4 and it is satisfactory as long as at least the preamble 101 is present in the frame configuration.

Next, an explanation will be given separately of an operation of the radio transceiver in the first embodiment at the time of transmission and at the time of reception.

Figure 5:
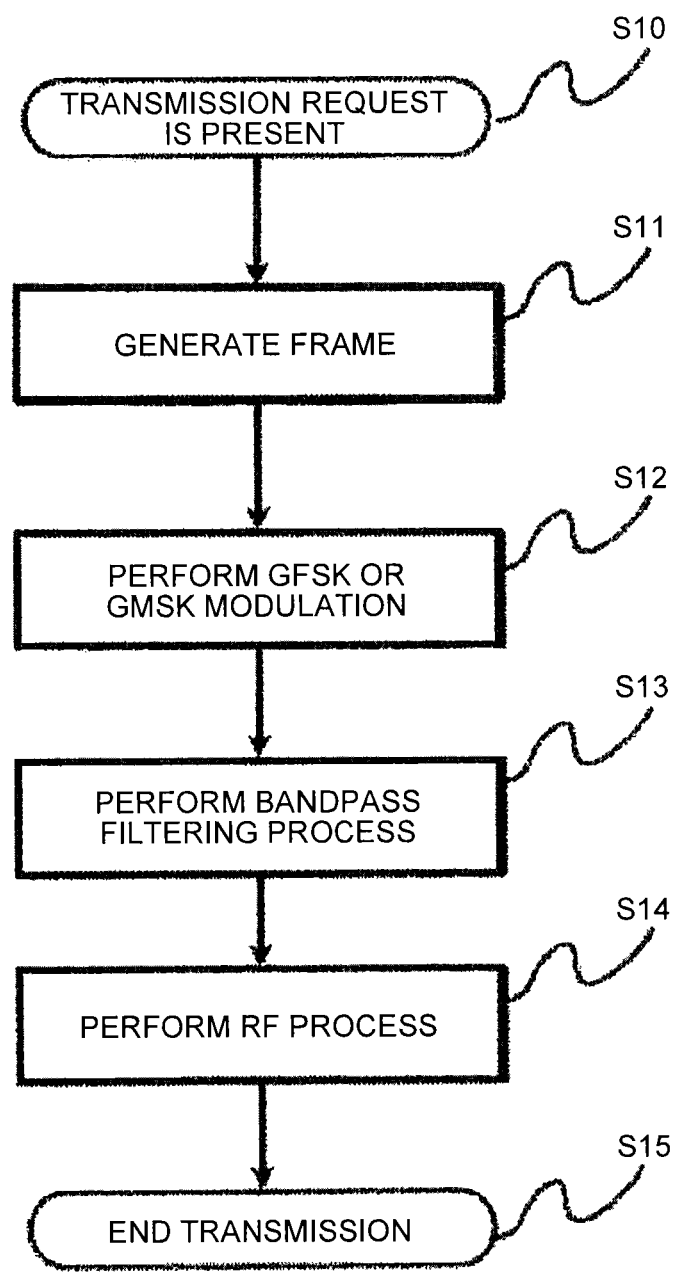
FIG. 5 is a flowchart for the radio transceiver according to the first embodiment at the time of transmission.

FIG. 5 is a flowchart of the operation of the radio transceiver at the time of transmission. At Step 10, when the transmission control unit 600 receives a transmission request from the upper-level unit (for example, a MAC unit (not illustrated)), the transmission control unit 600 issues an instruction, which will be described later, to the antenna switching unit 100, the modulation unit 400, and the frame generation unit 500 on the basis of this transmission request.

Next, at Step 11, the frame generation unit 500 adds the unique word 102 and the preamble 101 to the PHY payload 103 to be transmitted on the basis of the instruction from the transmission control unit 600 and outputs this frame signal to the modulation unit 400.

Next, at Step 12, the modulation unit 400 performs GFSK modulation or GMSK modulation on the frame signal input from the frame generation unit 500 on the basis of the instruction from the transmission control unit 600 and outputs the modulated signal to the bandpass filter unit 300.

Next, at Step 13, the bandpass filter unit 300 limits the bandwidth of the modulated signal input from the modulation unit 400 and outputs the band-limited signal to the RF unit.

Next, at Step 14, the RF unit 200 performs D/A conversion and up-conversion on the band-limited signal input from the bandpass filter unit 300 to generate a radio signal and outputs the generated radio signal to the antenna switching unit 100.

Next, at Step 15, the antenna switching unit 100 outputs the radio signal to the antenna (antenna specified from among the antenna #1 and the antenna #2) specified on the basis of the instruction from the transmission control unit 600 and the specified antenna #1 or antenna #2 transmits the input radio signal to the partner receiver. The transmission operation is not limited to the method explained in this embodiment.

Figure 6:
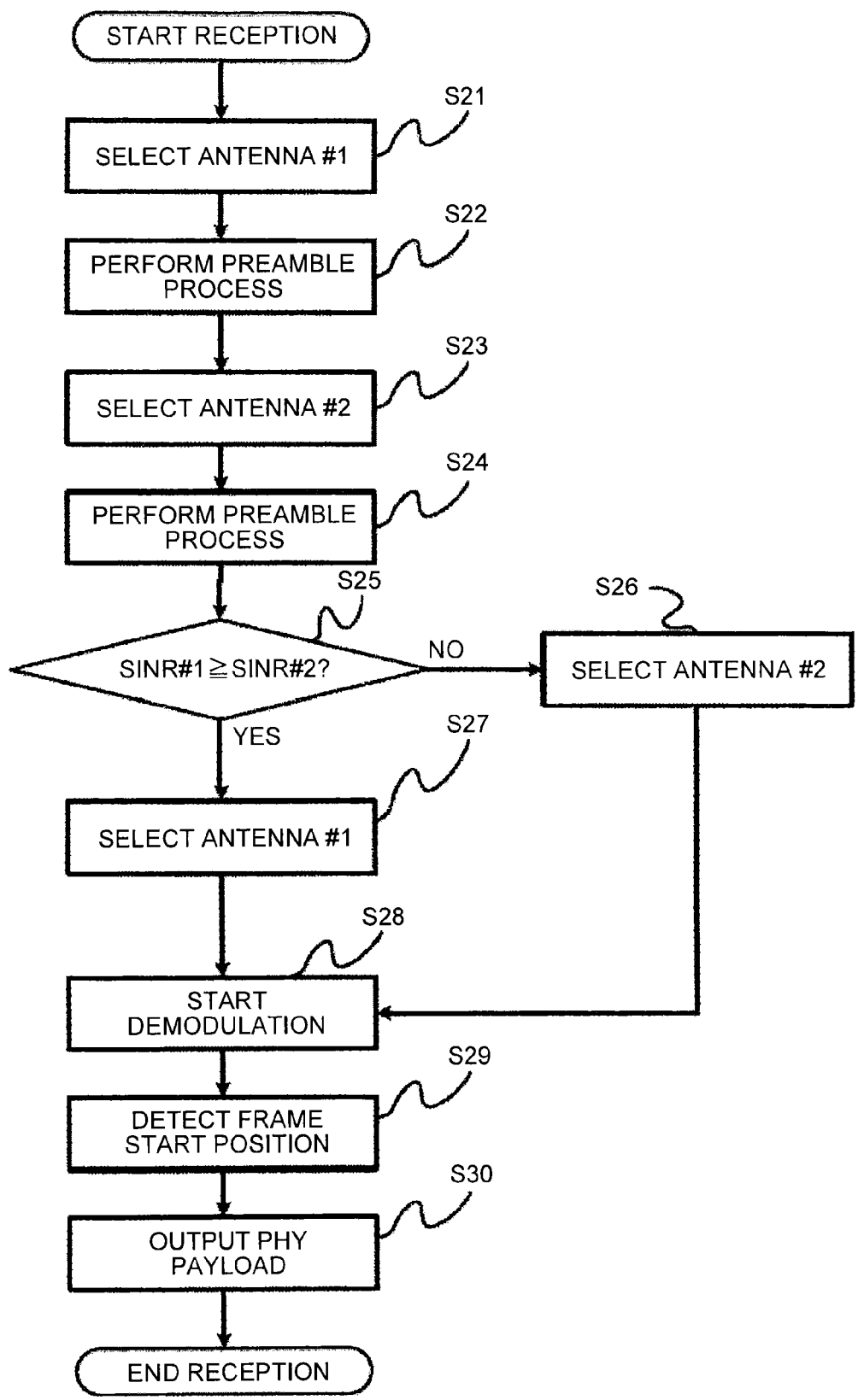
FIG. 6 is a flowchart for the radio transceiver according to the first embodiment at the time of reception.

FIG. 6 is a flowchart of the operation of the radio transceiver at the time of reception. The preamble processes at Step 22 and Step 24 in FIG. 6 are a bit timing process and an SINR estimation process, which will be described later in detail.

At Step 21, the reception control unit 900 selects the antenna #1 or the antenna #2 and instructs the antenna switching unit 100 to switch to the selected antenna. An explanation will be given here of a case where the antenna #1 is first selected. The antenna #1, switched to by the antenna switching unit 100, outputs a detected radio wave to the RF unit 200. The RF unit 200 performs A/D conversion and down-conversion on the input signal and outputs the signal to the bandpass filter unit 300. The bandpass filter unit 300 limits the bandwidth of the input signal and outputs the band-limited signal to the demodulation unit 700 and the preamble processing unit 800.

Next, at Step 22, the preamble processing unit 800 performs the preamble process on the input signal having the preamble 101 for T1, which is a certain period of time. The preamble processing unit 800 then outputs an SINR#1 value, which is calculated by performing the preamble process, to the reception control unit 900. The preamble process will be described later.

Next, at Step 23, the reception control unit 900 instructs the antenna switching unit 100 to switch from the antenna #1 to the antenna #2 after T1 elapses. The switched-to antenna #2 outputs the detected radio wave to the RF unit 200, and the RF unit 200 performs A/D conversion and down-conversion and outputs the signal to the bandpass filter unit 300. The bandpass filter unit 300 limits the bandwidth of the input signal and outputs the band-limited signal to the demodulation unit 700 and the preamble processing unit 800.

Next, at Step 24, the preamble processing unit 800 performs the preamble process on the input signal having the preamble 101 for T2, which is a certain period of time. The preamble processing unit 800 outputs an SINR#2 value, which is calculated by performing the preamble process, to the reception control unit 900. The preamble process will be described later.

Next, at Step 25, the reception control unit 900 compares the SINR#1, which is an SINR value estimated when the preamble process is performed on the preamble 101 based on the detection by the antenna #1, and the SINR#2, which is an SINR value estimated when the preamble process is performed on the preamble 101 based on the detection by the antenna #2.

When the SINR#1 is larger, at Step 27, the reception control unit 900 causes the antenna switching unit 100 to select the antenna #1. When the SINR#2 is larger, at Step 26, the reception control unit 900 causes the antenna switching unit 100 to select the antenna #2. The calculation of the SINR values will be described later.

Next, at Step 28, the demodulation unit 700 starts demodulation on the signal that is detected and acquired by using the antenna selected at Step 26 or Step 27. Accordingly, it is possible to demodulate a radio signal that is acquired by using an optimum antenna.

Next, at Step 29, the frame detection unit 110 detects the unique word 102 portion in the frame on the basis of the demodulation result acquired by the demodulation unit 700 to detect the start position of the PHY payload 103 subsequent to the unique word 102.

Next, at Step 30, the demodulation unit 700 outputs the demodulated PHY payload 103 to the upper-level unit (for example, MAC) on the basis of the detection of the frame start position detected by the frame detection unit 110.

Next, the preamble process (Step 21 and Step 24) in FIG. 6 will be explained in detail. As illustrated in FIG. 2, in the preamble process, the bit timing detection unit 810 of the preamble processing unit 800 performs the bit timing process and the SINR estimation unit 820 performs the SINR estimation.

The bit timing process is performed in the bit timing detection unit 810. Typical methods of the bit timing process, for example, include zero-cross timing detection; however, the invention of the present application is not limited to this.

Figure 7:
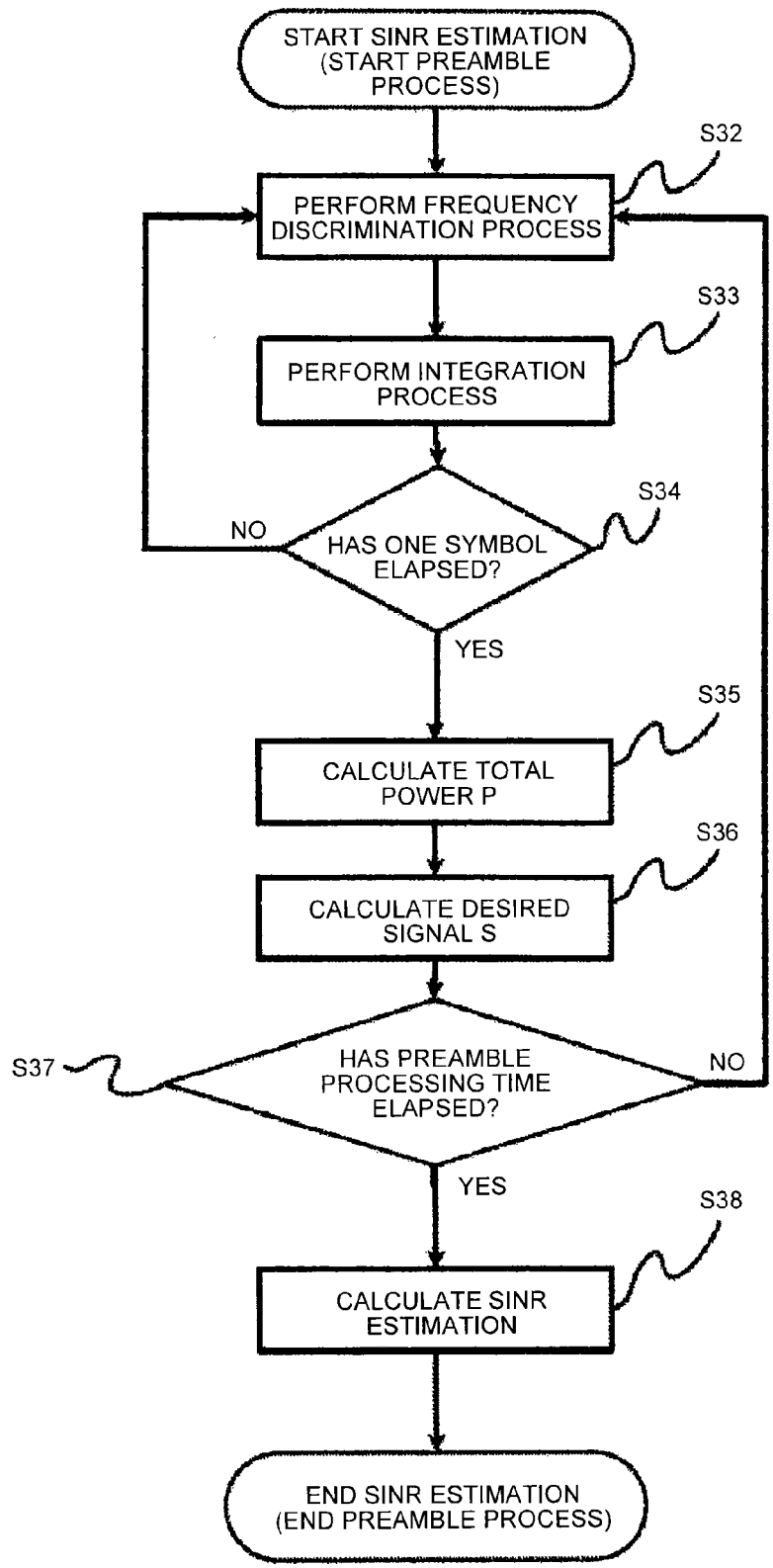
FIG. 7 is a flowchart for the SINR estimation unit according to the first embodiment.

The operation of the SINR estimation unit 820 will be explained with reference to FIG. 7. When the preamble process is started, at Step 32, the frequency discrimination detector 821 performs a frequency discrimination process to convert the frequency component of the signal on which GFSK or GMSK modulation is performed into amplitude and outputs the converted signal to the integration unit 822.

Next, at Step 33, the integration unit 822 performs for each sample an integration process on the signal that is input from the frequency discrimination detector 821 and on which the frequency discrimination process is performed.

Next, at Step 34, the integration unit 822 performs the integration process by repeating Step 32 and Step 33 until one symbol is elapsed and outputs a phase signal for each symbol, which is an integration result, to the square calculation unit 823 and the correlation calculation unit 824.

Next, at Step 35, the square calculation unit 823 calculates a square of the value (the value in the case of the n-th symbol is ph[n]) acquired by performing the integration process for one symbol and adds the calculated value to the previous total power value p[n−1] to calculate the total power value p[n]. Specifically, the total power value p[n] is calculated by using the following equation.

$$p[n] = \sum_{i=0}^{n} [ph[i]]^2 \qquad (1)$$

Next, at Step 36, the correlation calculation unit 824 calculates a complex correlation between ph[n] acquired by performing the integration process for one symbol and a complex sine wave generated by the complex-sine-wave generation unit 825 and adds it to the previous correlation value as a complex component to acquire a desired signal S[n].

For the complex sine wave generated by the complex-sine-wave generation unit, a complex sine wave that satisfies the following expression with respect to the n-th symbol is used:

$$\exp\left[\frac{2\pi}{N_s \times N_b} n\right] \qquad (2)$$

where Ns indicates the number of samples in one symbol and Nb indicates a value based on the preamble that is predetermined between the transmitter that transmits a radio signal and the receiver that receives a radio signal. When "01" is repeated, Nb is two; when "0011" is repeated, Nb is four; and when "000111" is repeated, Nb is six.

S[n] is calculated as follows:

$$S[n] = \sum_{i=0}^{n} \left\{ ph[i] \star \left(-\exp\left[\frac{2\pi}{N_s \times N_b} i\right]\right) \right\} \qquad (3)$$

where ph[n] is a scalar value, S[n] is a vector value, and * indicates a complex multiplication.

Step S32 to Step S36 are repeated until the preamble processing time (T1 or T2) elapses. When the preamble processing time has elapsed, S[i] is set as a desired signal and is output to the SINR calculation unit 826.

Next, at Step 38, after the preamble processing time (T1 or T2) has elapsed, the SINR calculation unit 826 calculates an SINR estimated value. The method of calculating an SINR estimated value is calculation as follows:

$$P = \frac{p[N_{symb}]}{2 \times N_{symb}} \qquad (4)$$

$$S = \left[\frac{s[N_{symb}]\text{Re}}{N_{symb}}\right]^2 + \left[\frac{s[N_{symb}]\text{Im}}{N_{symb}}\right]^2$$

where P indicates total power, S indicates desired wave signal power, and $N_{symb}$ indicates the number of preamble symbols.

When N indicates the interference wave and noise power, the noise power N is calculated as follows:

$$N = P - S \quad (5)$$

The SINR estimated value is calculated as follows by using S and N described above:

$$SINR = 10\log\left(\frac{S}{N}\right) \quad (6)$$

S/N may be used as the SINR estimated value without taking a logarithm. At Step S22, the result of Equation (6) is recorded as SINR#1 with respect to the signal detected by the antenna #1. At Step S24, the result of Equation (6) is recorded as SINR#2 with respect to the signal detected by the antenna #2.

The antenna selection unit 827 then compares SINR#1 and SINR#2, selects the antenna having a larger SINR, and thereafter uses the selected antenna for detecting radio waves.

As described above, according to the radio transceiver in the first embodiment of the present invention, a desired wave can be separated from an interference wave and noise by using a preamble by the power value calculation unit that calculates a power value on the basis of a phase signal and the correlation calculation unit that calculates a desired signal power from the correlation value between the phase signal and corresponding preamble information; therefore, it is possible to reduce interference by the receive antenna selection diversity on the basis of the pseudo SINR estimated value.

An explanation has been given here of a case where the radio transceiver includes the RF unit 200, the bandpass filter unit 300, the demodulation unit 700, the preamble processing unit 800, the frame detection unit 110, and the like, the number of each of which is one; however, it is not limited thereto. For example, if the number of each of the above units is two, the antenna #1 and the antenna #2 detect a radio wave at the same time and the preamble process and the like are performed on the detected same preambles 101 independently; therefore, it is possible to improve the estimate accuracy of SINR#1 and SINR#2 and thus improve the reception quality.

Second Embodiment

In the first embodiment, the preamble processing unit is explained separately to the bit timing detection unit 810 and the SINR estimation unit 820; however, in the present embodiment, the bit timing is detected by using the results from the correlation calculation unit 824; therefore, the bit timing detection unit 810 is not necessary. In other words, the bit timing is detected by using the results from the correlation calculation unit 824; therefore, the bit timing detection unit is not necessary and thus an effect is obtained where the size of the circuit of the radio transceiver is reduced. In the present embodiment, only the portions different from those in the first embodiment will be explained and an explanation of the common portions will be omitted.

Figure 8:
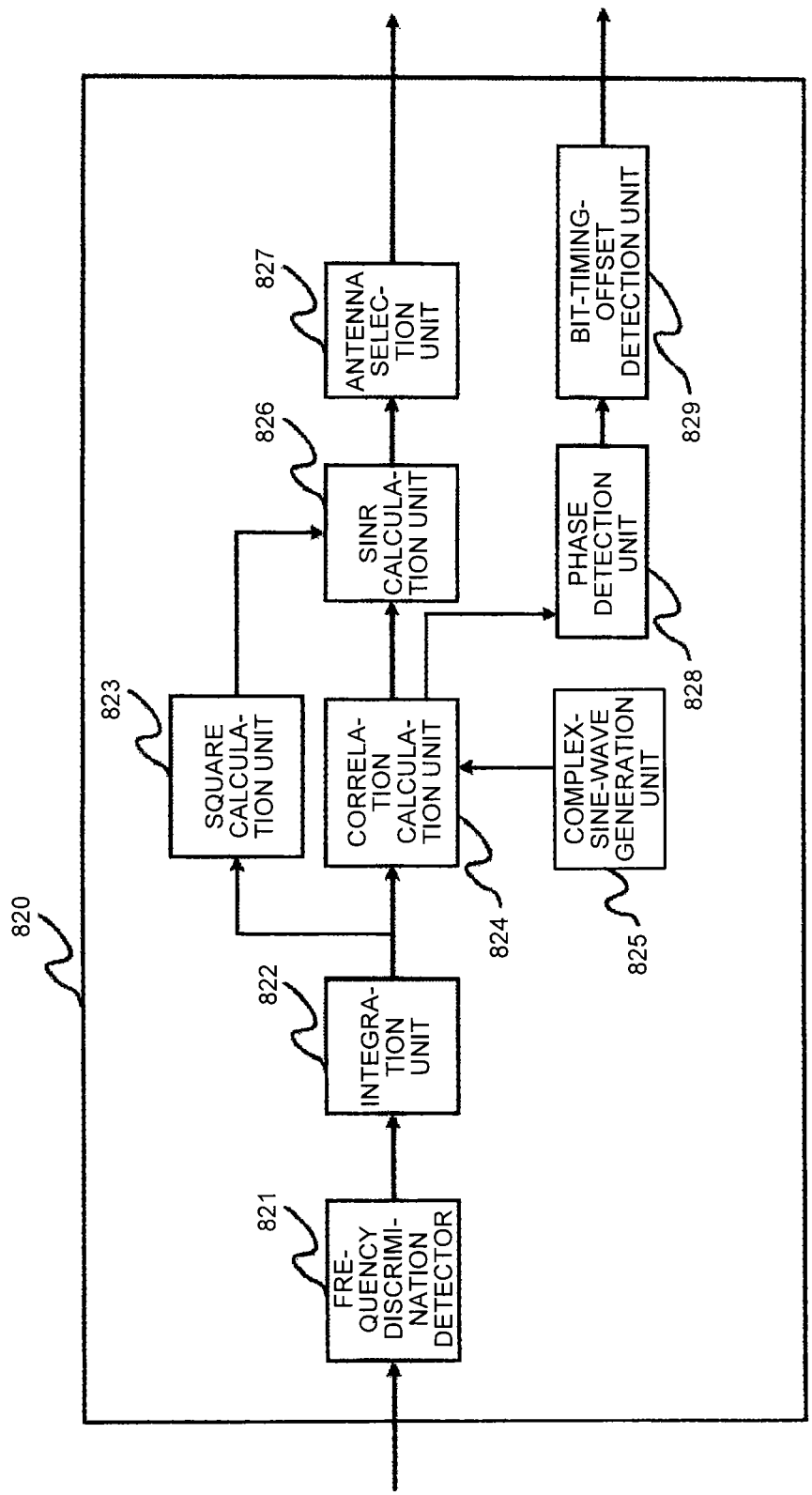
FIG. 8 is a diagram illustrating an SINR estimation unit according to a second embodiment.

The configuration of the SINR estimation unit 820, which is different from that in the first embodiment, will be explained with reference to FIG. 8. As illustrated in FIG. 8, the SINR estimation unit 820 further includes a phase detection unit 828 and a bit-timing-offset detection unit 829.

Next, the operation of the radio transceiver in the second embodiment will be explained. The operation at the time of transmission is the same as that in the first embodiment; therefore, only the operation at the time of reception will be explained.

Figure 9:
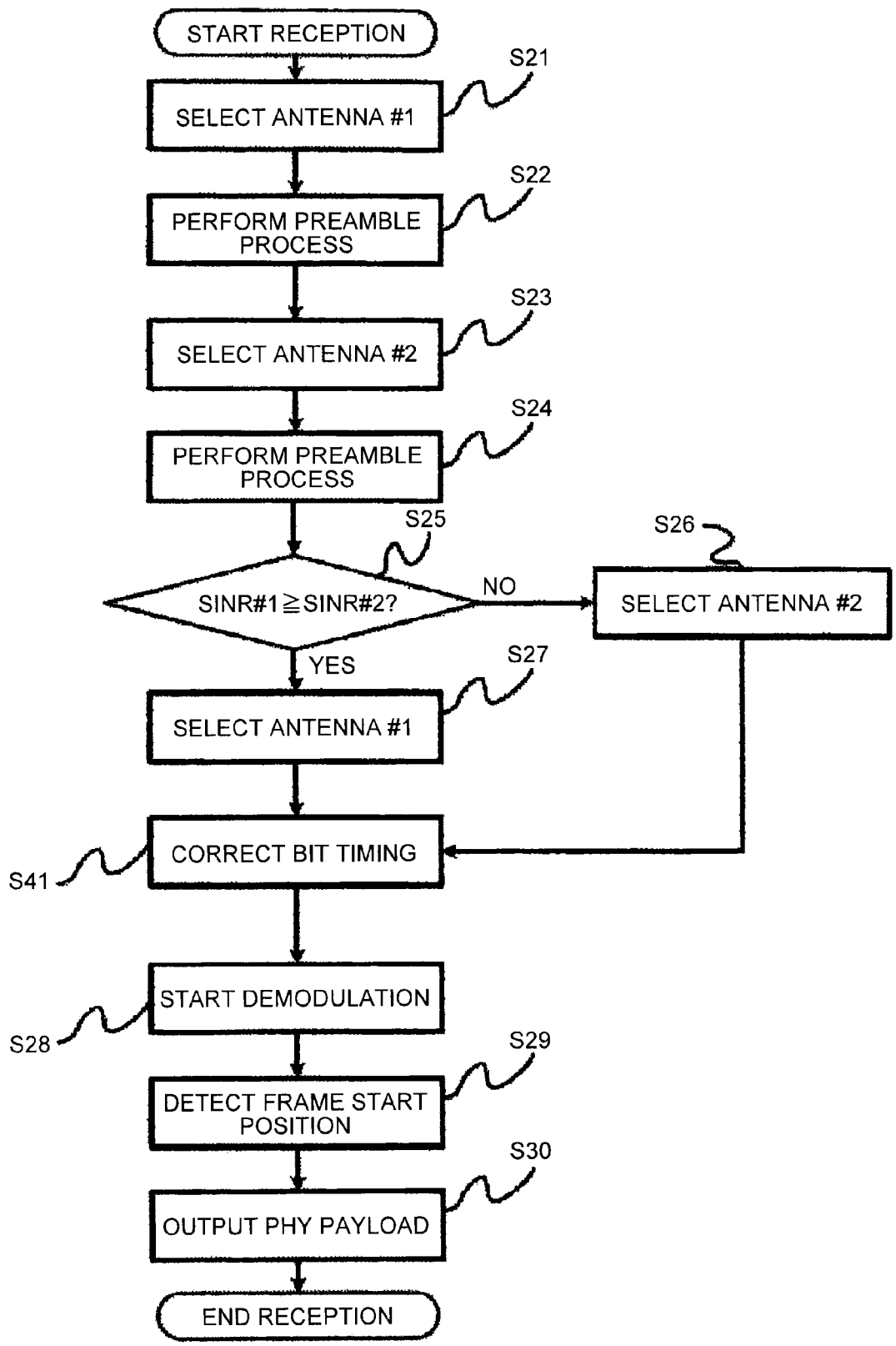
FIG. 9 is a flowchart for a radio transceiver according to a second embodiment at the time of reception.

The flowchart at the time of reception is illustrated in FIG. 9. The operation, with the exception of Step 41, is the same as that in the first embodiment. At Step 41, the bit timing is corrected by using the bit timing offset value that is calculated for the selected antenna from among a bit timing offset value Nbit#1 (which will be described later) calculated at Step 22 and a bit timing offset value Nbit#2 (which will be described later) calculated at Step 24.

Figure 10:
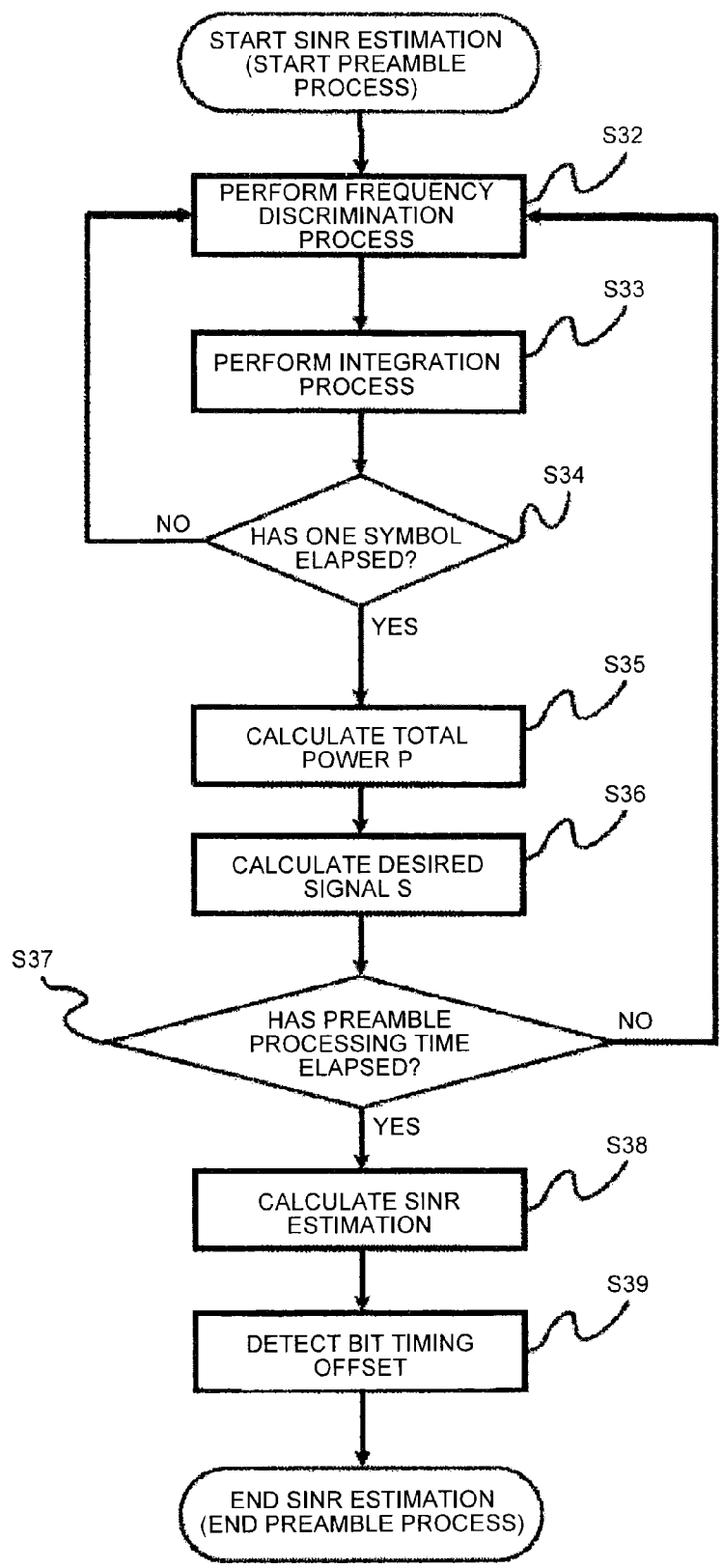
FIG. 10 is a flowchart for the SINR estimation unit according to the second embodiment.

The operational flow in the processes at Step 22 and Step 24 in FIG. 9 according to the second embodiment is illustrated in detail in FIG. 10. The operation, with the exception of Step 39, is the same as that in the first embodiment; therefore, an explanation thereof is omitted. At Step 39, the phase detection unit 828 calculates, by using the following Equation (7), a phase phbit with respect to the vector S[Nsymb] calculated in the correlation calculation unit 824 by using Equation (3).

$$ph_{bit} = \tan\left(\frac{s[N_{symb}]\text{Re}}{s[N_{symb}]\text{Im}}\right) \quad (7)$$

Next, the bit-timing-offset detection unit 829 converts the phase phbit into the bit timing offset Nbit. Because the sine wave used in Equation (2) is a sine wave whose period is Ns+Nb, the bit-timing-offset detection unit 829 calculates the bit timing offset as follows:

$$N_{bit} = \frac{ph_{bit}}{2\pi} \times (N_s \times N_b) \quad (8)$$

At Step 22, the result of Equation (8) is stored as Nbit#1. At Step 24, the result of Equation (8) is stored as Nbit#2.

As described above, in the second embodiment, the correlation calculation unit calculates a phase on the basis of the desired signal power, and the bit-timing-offset detection unit detects the bit timing offset on the basis of the phase detected by the phase detection unit; therefore, a bit timing processing circuit is not necessary and thus it is possible to reduce the amount of calculation and circuit size.

Third Embodiment

In the first and second embodiments, an explanation has been given of a case where transmission is performed by using a fixed antenna on the transmission side and the selected antenna is used at the time of reception. In the present embodiment, the antenna selected on the basis of the SINR estimation performed on the reception side is used also at the time of transmission. Therefore, the communication quality can be improved both in transmission and reception. The configuration diagram for the present embodiment is the same as that for the first embodiment.

Next, because the operation of the radio transceiver in the third embodiment at the time of reception is the same as that in the first or second embodiment, only the operation at the time of transmission will be explained.

Figure 11:
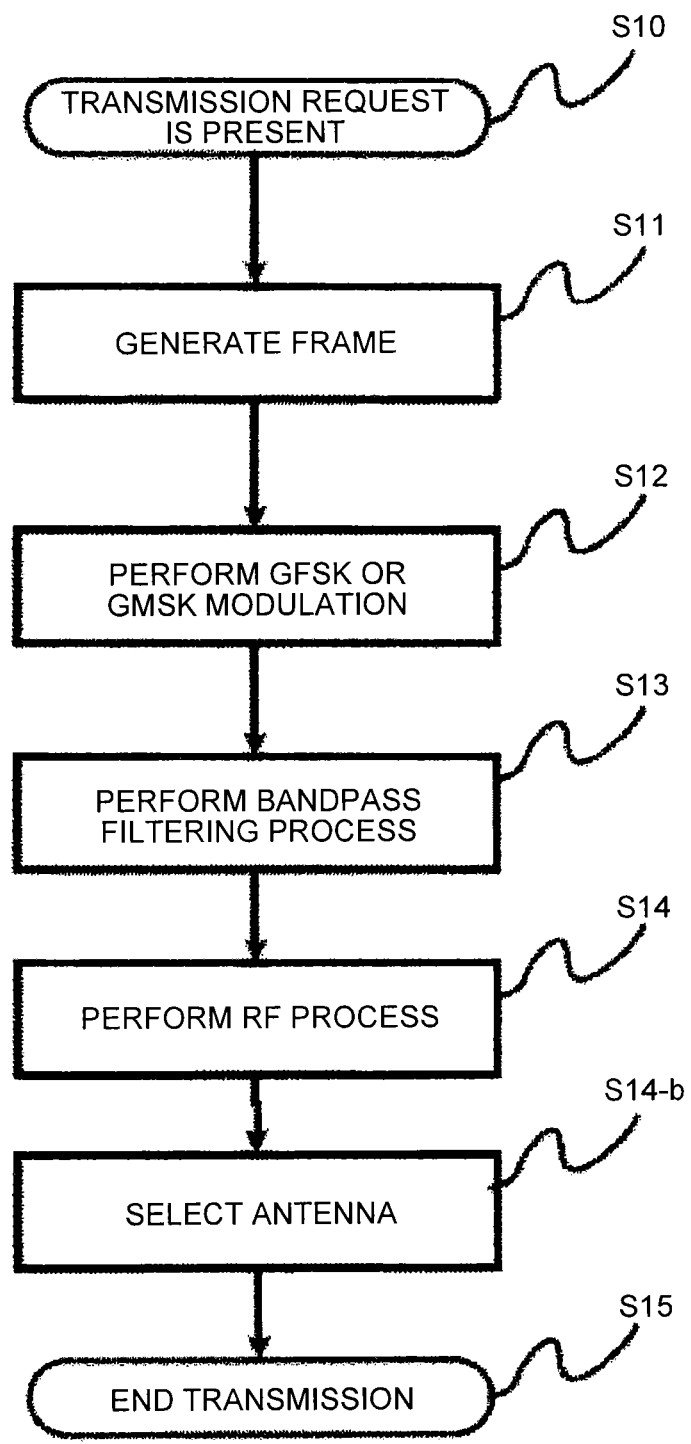
FIG. 11 is a flowchart for a radio transceiver according to a third embodiment at the time of transmission.

The operational flow of the radio transceiver at the time of transmission is illustrated in FIG. 11. The operation, with the exception of Step 14*b*, is the same as that in the first or second embodiment; therefore, an explanation thereof is omitted. At Step 14*b*, the antenna selected on the reception side is selected, and, when data is transmitted, a radio signal is transmitted by using the selected antenna.

According to the third embodiment, the communication quality can be improved not only at the time of reception but also at the time of transmission by using, for transmission, the antenna selected at the time of reception. An explanation has been given here of a case where the selected antenna is used both at the time of transmission and at the time of reception; however, it is not limited thereto and the selected antenna can also be used only at the time of transmission.

Fourth Embodiment

In a fourth embodiment, the receive antenna is switched with reference to both the SINR estimation and the received power. When the antenna is selected with reference to only the SINR estimation, if the absolute value of the SINR values from both the antennas is small, an appropriate antenna is not always selected; therefore, it is preferable in some cases to use an antenna whose received power is larger. Therefore, when the SINR estimated value of the selected antenna is less than a threshold, a signal is received by using the antenna whose received power is larger. Accordingly, the accuracy of the receive antenna can be further improved.

Figure 12:
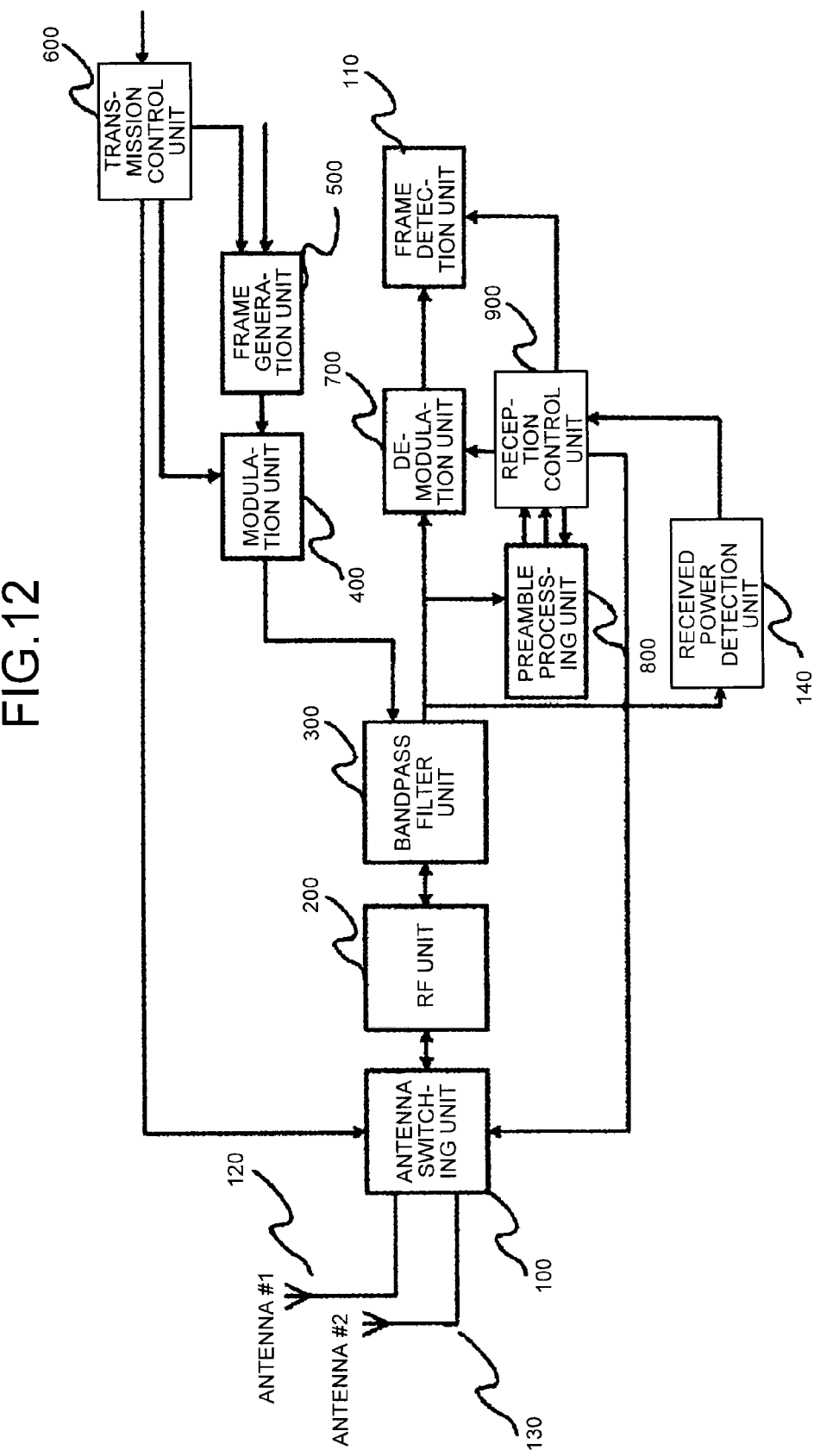
FIG. 12 is an overall view of a radio transceiver according to a fourth embodiment.

The configuration diagram according to the fourth embodiment is illustrated in FIG. 12. Components other than a received power detection unit 140 are the same as those in the first to third embodiments.

Figure 13:
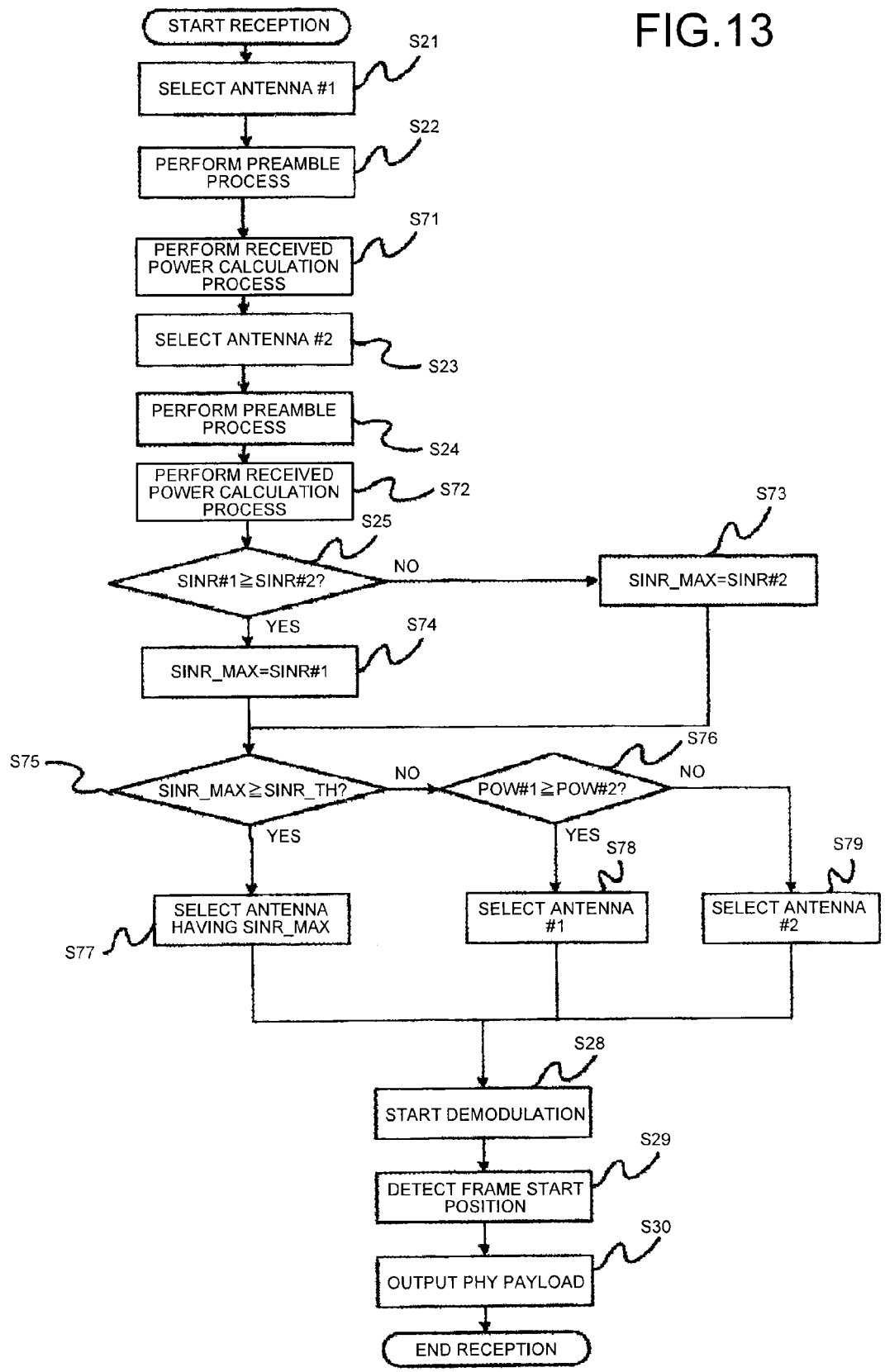
FIG. 13 is a flowchart for the radio transceiver according to the fourth embodiment at the time of reception.
Figure 14:
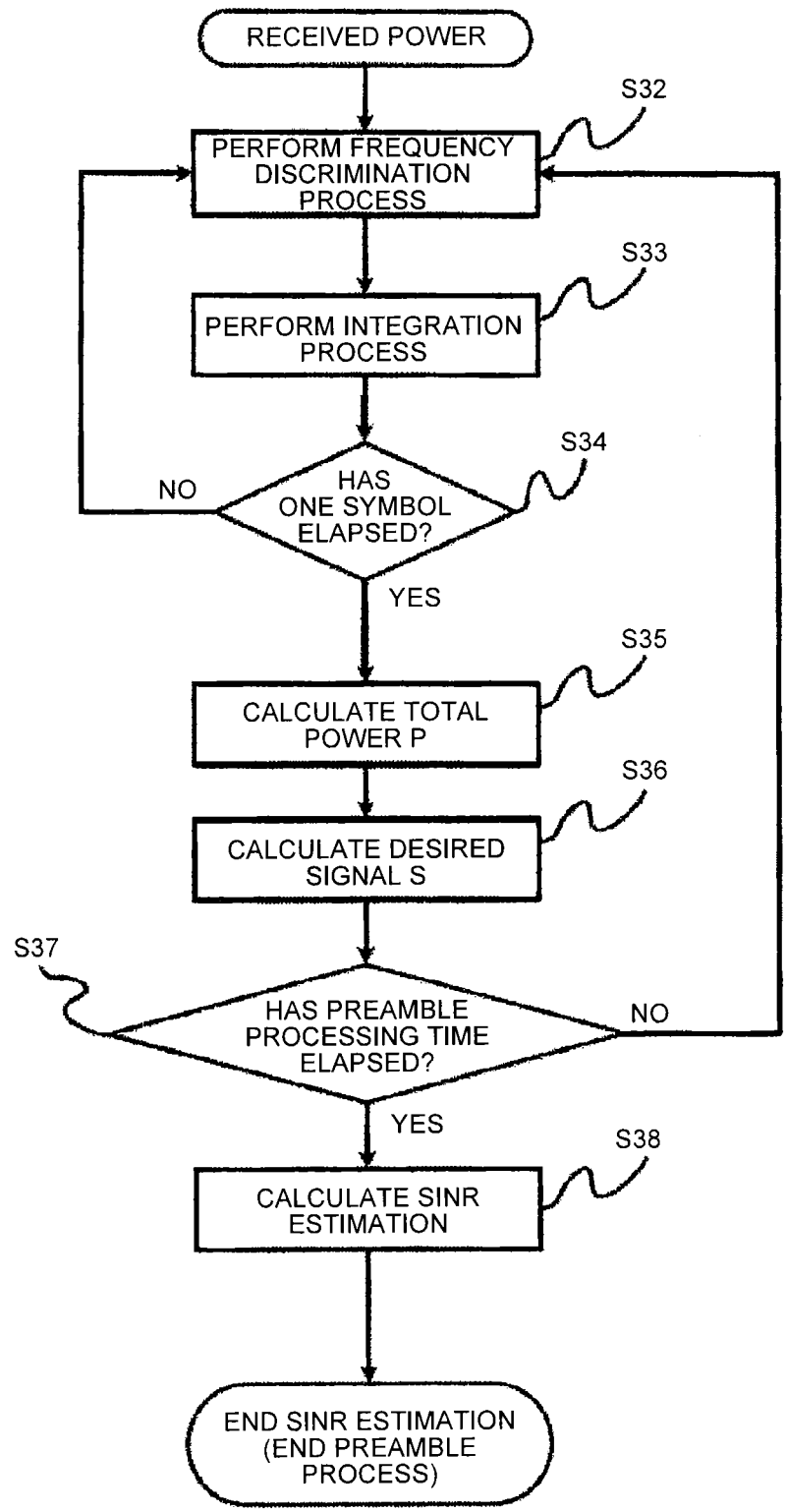
FIG. 14 is a flowchart for an SINR estimation unit according to the fourth embodiment.

Next, the operation of a radio transceiver in the fourth embodiment will be explained. The operation at the time of transmission is the same as that in the first to third embodiments; therefore, only the operation at the time of reception will be explained. The operational flow of the radio transceiver at the time of reception is illustrated in FIG. 13. Step 21 to Step 25 and Steps 28 to 30 are the same as those in the first to third embodiments.

Moreover, the operation of the preamble processing unit 800 is the same as that in the first to third embodiments. At Step 71, the received power detection unit 140 calculates an average received power POW#1 per symbol in the section of the preamble process at Step 22 by using the antenna #1.

At Step 72, the received power detection unit 140 calculates an average received power POW#2 per symbol in the section of the preamble process at Step 24 by using the antenna #2.

At Step 25, the reception control unit 900 selects the larger one of the SINR estimated value #1 and the SINR estimated value #2 calculated in the preamble processing unit 800 and, at Step 73 and Step 74, the reception control unit 900 sets the selected SINR estimated value as SINR_MAX.

At Step 75, the reception control unit 900 compares a preset threshold SINR_TH with SINR_MAX.

When the value of SINR_MAX is smaller than SINR_TH, POW#1 and POW#2 are compared at Step 76. In contrast, when the value of SINR_MAX is equal to or larger than SINR_TH, the antenna having SINR_MAX is selected at Step 77.

When POW#2 is larger, the antenna #2 is selected at Step 79. When POW#1 is larger, the antenna #1 is selected at Step 78. The operation after the antenna is selected is the same as that in the first to third embodiments. The received powers POW#1 and POW#2 may be calculated from the output results of the bandpass filter unit 300 without using the received power detection unit 140.

As described above, in the fourth embodiment, when the SINR value of the antenna selected on the basis of the SINR estimated value is smaller than a predetermined threshold, an antenna is selected on the basis of the received power value. Therefore, the antenna selection accuracy can be improved.

INDUSTRIAL APPLICABILITY

As described above, the radio and the antenna selection method for the radio according to the present invention are suitable for improving communication quality.

REFERENCE SIGNS LIST

100: antenna switching unit, 200: RF unit, 300: bandpass filter unit, 400: modulation unit, 500: frame generation unit, 600: transmission control unit, 700: demodulation unit, 800: preamble processing unit, 900: reception control unit, 110: frame detection unit, 120: antenna #1, 130: antenna #2, 810: bit timing detection unit, 820: SINR estimation unit, 821: frequency discrimination detector, 822: integration unit, 823: square calculation unit, 824: correlation calculation unit, 825: complex-sine-wave generation unit, 826: SINR calculation unit, 827: antenna selection unit, 101: preamble, 102: unique word, 103: PHY payload, 140: received power detection unit

The invention claimed is:

1. A radio that calculates an SINR on a basis of received preamble information received by an antenna and corresponding preamble information stored in advance corresponding to the received preamble information, the radio comprising:
   an integration unit that calculates a phase signal for each symbol with respect to the received preamble information;
   a power value calculation unit that calculates a power value on a basis of the phase signal;
   a correlation calculation unit that calculates a desired signal power from a correlation value between the phase signal and the corresponding preamble information; and
   an SINR calculation unit that calculates an SINR value from the power value and the desired signal power.

2. The radio according to claim 1, further comprising an antenna selection unit, wherein
   the antenna selection unit selects an antenna on a basis of a first SINR value calculated from received preamble information received by a first antenna and a second SINR value calculated from received preamble information received by a second antenna.

3. The radio according to claim 2, further comprising an antenna switching unit, wherein
   the antenna switching unit causes an antenna selected by the antenna selection unit to receive a radio signal.

4. The radio according to claim 2, further comprising an antenna switching unit, wherein the antenna switching unit causes an antenna selected by the antenna selection unit to transmit a radio signal.

5. The radio according to claim 2, further comprising a received power detection unit, wherein when an SINR value corresponding to the selected antenna is smaller than a predetermined threshold, the received power detection unit calculates a first received power when the first antenna receives a received preamble and calculates a second received power when the second antenna receives a received preamble, and the antenna selection unit selects an antenna on a basis of the first received power and the second received power.

6. The radio according to claim 1, further comprising:

a phase detection unit; and a bit-timing-offset detection unit, wherein the phase detection unit calculates a phase on a basis of a desired signal power calculated by the correlation calculation unit, and the bit-timing-offset detection unit detects a bit timing offset on a basis of a phase detected by the phase detection unit.

7. An antenna selection method for a radio that calculates an SINR on a basis of received preamble information received by an antenna and corresponding preamble information stored in advance corresponding to the received preamble information, the method comprising:

integrating step of calculating a phase signal for each symbol with respect to the received preamble information;

power value calculating step of calculating a power value on a basis of the phase signal;

correlation calculating step of calculating a desired signal power from a correlation value between the phase signal and the corresponding preamble information; and SINR calculating step of calculating an SINR value from the power value and the desired signal power.

* * * * *